United States Patent
Schwab et al.

(10) Patent No.: US 11,894,582 B2
(45) Date of Patent: Feb. 6, 2024

(54) STOPPER FOR CLOSING AND SEALING AN OPENING IN A HOUSING OF AN ENERGY STORAGE SYSTEM AND ENERGY STORAGE SYSTEM

(71) Applicant: Clarios Germany GmbH & Co. KG, Hannover (DE)

(72) Inventors: Julius Schwab, Hannover (DE); Ingo Koch, Hameln (DE); Armin Staffeldt, Lauenbruck (DE); Bernd Ide, Hannover (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 1000 days.

(21) Appl. No.: 16/474,892

(22) PCT Filed: Dec. 19, 2017

(86) PCT No.: PCT/EP2017/083644
§ 371 (c)(1),
(2) Date: Jun. 28, 2019

(87) PCT Pub. No.: WO2018/127410
PCT Pub. Date: Jul. 12, 2018

(65) Prior Publication Data
US 2022/0247054 A1 Aug. 4, 2022

(30) Foreign Application Priority Data
Jan. 3, 2017 (DE) .......................... 102017100049.6

(51) Int. Cl.
*H01M 50/645* (2021.01)
(52) U.S. Cl.
CPC ...... *H01M 50/645* (2021.01); *H01M 2220/20* (2013.01)

(58) Field of Classification Search
None
See application file for complete search history.

(56) References Cited

U.S. PATENT DOCUMENTS

| 2001/0041286 A1* | 11/2001 | Cramer | H01M 50/35 429/89 |
| 2003/0047884 A1* | 3/2003 | Yamaguchi | H01M 10/484 277/637 |
| 2017/0098805 A1* | 4/2017 | Liu | H01M 50/24 |

FOREIGN PATENT DOCUMENTS

| CN | 1413887 A | 3/2003 |
| CN | 101138110 A | 5/2005 |

(Continued)

OTHER PUBLICATIONS

International Search Report of the European Patent Office dated Mar. 6, 2018, for PCT/EP2017/083644 filed Dec. 19, 2017, 2 pages.

(Continued)

*Primary Examiner* — Carmen V Lyles-Irving
(74) *Attorney, Agent, or Firm* — Boardman & Clark LLP (57) ABSTRACT

A stopper (1) for closing and sealing an opening (120) in a housing (110) of an energy storage system (100), in particular for closing and sealing an opening (120) in a housing (110) of a lead acid storage battery, wherein the stopper (1) comprises a connecting region (20), which is configured to engage with the opening (120) in the energy storage system (100), and a sealing region (30), which is disposed above the connecting region (20) in the axial direction (A) of the stopper (1), wherein the sealing region (30) is configured to accommodate a sealing element (32) which is designed to be deformed by a force acting at least partially, in particular completely, in the axial direction (A) of the stopper (1) when the stopper (1) is in the installed state.

13 Claims, 4 Drawing Sheets

(56) References Cited

FOREIGN PATENT DOCUMENTS

| | | |
|---|---|---|
| CN | 1889287 A | 1/2007 |
| CN | 102341934 A | 7/2010 |
| CN | 102439759 A | 11/2010 |
| CN | 102598357 A | 3/2011 |
| CN | 103078069 A | 5/2013 |
| CN | 203815149 U | 9/2014 |
| DE | 19751136 A1 | 5/1999 |
| DE | 102008009864 A1 | 8/2009 |
| EP | 0920063 A1 | 6/1999 |
| EP | 1156538 A2 | 11/2001 |
| EP | 1248315 A2 | 10/2002 |
| EP | 1432061 A1 | 6/2004 |
| JP | 2002305021 A | 10/2002 |
| JP | 2002352787 A | 12/2002 |
| WO | 2017/108650 A1 | 6/2017 |
| WO | 2017108650 A1 | 6/2017 |
| WO | 2018/127410 A1 | 7/2018 |

OTHER PUBLICATIONS

Hydraulic and Pneumatic Technology, by Hong Zhang, et. al., Southwest Jiaotong University Press, Sep. 30, 2015, p. 113-118.

* cited by examiner

STOPPER FOR CLOSING AND SEALING AN OPENING IN A HOUSING OF AN ENERGY STORAGE SYSTEM AND ENERGY STORAGE SYSTEM

CROSS REFERENCE TO RELATED APPLICATION

This application is a National Stage Entry of PCT/EP2017/083644, entitled "STOPPER FOR CLOSING AND SEALING AN OPENING IN A HOUSING OF AN ENERGY STORAGE SYSTEM AND ENERGY STORAGE SYSTEM" filed Dec. 19, 2017, which claims priority to German Application No. 102017100049.6, entitled "STOPPER FOR CLOSING AND SEALING AN OPENING IN A HOUSING OF AN ENERGY STORAGE SYSTEM AND ENERGY STORAGE SYSTEM", filed on Jan. 3, 2017, the entire contents of each of which are hereby incorporated herein by reference for all purposes.

DESCRIPTION

The present invention relates to a stopper according to the preamble of claim 1. The invention furthermore concerns an energy storage system according to the preamble of claim 13.

Known stoppers for closing an opening in a housing of an energy storage system, for example, usually have round or flat sealing rings which are received loosely in a groove of the stopper and usually only partially fill this. In particular, such sealing rings of conventional stoppers normally take the form of O-rings. These work on the principle of being deformed by a radial crush loading occurring during the screwing process, and because of this crush loading create a sealing effect.

Such sealing rings are however subject to high wear. Thus for example frequent insertion and removal of the stopper may lead to a deterioration in the material of the sealing rings, which may reduce the sealing effect. However, the material may also be damaged by frequent temperature changes. This too leads to a reduced sealing effect. In addition, conventional sealing rings which are produced separately must be installed in a complex mounting process. This makes installation of the sealing rings on the stopper time-consuming and cost-intensive.

The object of the present invention is therefore to provide an improved stopper which does not have the disadvantages of the prior art, and in addition is simple and economic to produce and install.

Regarding the stopper, the object on which the invention is based is achieved according to the invention by the subject matter of independent patent claim 1. With regard to the energy storage system for use in a vehicle with at least one such stopper, the object on which the invention is based is achieved by the subject matter of alternative independent patent claim 13. Advantageous developments are specified in the dependent patent claims.

Accordingly, a stopper according to the invention is provided for closing and sealing an opening in a housing of an energy storage system, in particular for closing and sealing an opening in a housing of a lead acid accumulator. The stopper has a connecting region which is configured to come into engagement with the opening of the energy storage system, and a sealing region arranged above the connecting region in the axial direction of the stopper. The sealing region is configured to accommodate a sealing element which is designed to be deformed by a force acting at least partially, in particular completely, in the axial direction of the stopper when the stopper is in the installed state.

The advantages of the invention are obvious. Using the stopper according to the invention, an opening of a housing can be closed and sealed economically and securely. In particular, the sealing element—which is deformed by a force acting at least partially, in particular completely, in the axial direction of the stopper—is not weakened even under high thermal and/or mechanical (dynamic) loads. For example, the stopper and the housing of the energy storage system may execute movements which are directed at least minimally contrary to each other, caused for example by vibrations of the energy storage system. In the case of a conventional sealing element, such as for example an O-ring, such contrary movements would rapidly lead to deterioration of the material of the sealing element, and hence to a reduction in the sealing effect. Because the sealing element according to the invention is deformed by a force acting at least partially, in particular completely, in the axial direction of the stopper, the mechanical load on the stopper from vibrations or contrary movements of the stopper and housing is low. Because at least substantially no deformation caused by radial forces occurs in the sealing element, a deterioration of the material of the sealing element is also avoided. Therefore a sealing effect can be guaranteed even under dynamic loads.

Also, an elongation of the stopper can be avoided or reduced because the sealing element is arranged above the connecting region, viewed in the axial direction of the stopper. Elongation of the stopper would lead to a force reduction and hence to a reduction in the sealing effect.

Because the sealing element undergoes at least substantially no radial deformation, the mechanical and/or thermal resistance of the sealing element is also advantageously improved.

According to a further aspect of the invention, the sealing region is configured to accommodate a sealing element such that a sealing effect of the sealing element is generated by a force acting at least partially, in particular completely, in the axial direction of the stopper.

Because the sealing effect is produced by a force acting at least partially, in particular completely, in the axial direction of the stopper, the sealing effect is permanently guaranteed even under high thermal and/or mechanical (dynamic) loads. In particular, the sealing effect is produced by the force occurring on installation of the stopper and acting at least partially, in particular completely, in the axial direction of the stopper.

A further part of the sealing effect is achieved by the reset force of the sealing effect caused by installation. This force coupling allows the sealing effect to be maintained even under high thermal influences which could otherwise cause a reduction in both forces, for example by changing the material properties or by producing "settling" movements. The term "producing settling movements" or "settling" in this context means a loss in preload force of the connection when the stopper is in the fitted state.

According to a further aspect of the invention, a cross-section of the sealing element, in particular in a non-fitted state of the stopper, has a shape which differs at least substantially from a circular form, in particular has at least substantially an L shape.

Because the shape of the cross-section of the sealing element differs substantially from a circular form, it is guaranteed that the sealing element can be deformed at least substantially, in particular completely, in the axial direction, in particular without deforming the sealing element also in the radial direction. This firstly facilitates installation of the stopper, in particular on repeated installation and/or removal of the stopper, and secondly the sealing effect is advantageously further improved even under high thermal and/or mechanical (dynamic) loads.

According to a further aspect of the invention, the sealing element has a first region on a side of the sealing element facing the connecting region, and a second region on a side of the sealing element facing away from the connecting region.

According to a further aspect of the invention, the second region of the sealing element, in particular in a non-fitted state of the stopper, has a larger outer diameter than the first region.

This advantageously guarantees that, in the fitted state of the stopper, the force acting in the axial direction of the stopper can be absorbed without also deforming the sealing element in a radial direction. In addition, the contact area or support area of the sealing element is enlarged. This advantageously also increases the sealing effect of the sealing element.

According to a further aspect of the invention, in a fitted state of the stopper, the sealing element, in particular a second region of the sealing element, is in engagement with a sealing rib which extends upward in the direction of the sealing region of the stopper, viewed in the axial direction of the stopper, along an inner periphery of the opening receiving the stopper, in particular of a region of the opening receiving the stopper body, and which is configured to exert the force acting on the sealing element, in particular on the second region of the sealing element, at least partially, in particular completely in the axial direction of the stopper.

The stopper here has a stopper head and the stopper body, wherein the stopper body in turn comprises the connecting region and the sealing region. The sealing region on the one side adjoins the stopper head and on the opposite side adjoins the connecting region.

Because of the sealing rib cooperating with the sealing element, advantageously a force coupling occurs which can reinforce the sealing effect of the sealing element. The force coupling is created firstly from the force acting on installation in the axial direction of the stopper, and secondly from a reset force of the sealing element which is provoked by the force acting in the axial direction of the stopper. This force coupling advantageously allows the sealing effect to be maintained even under high thermal and/or mechanical (dynamic) influences. Such high thermal and/or mechanical influences may firstly cause a reduction in the two forces, in particular due to a change in material properties, or produce "settling" movements, i.e. a loss in the preload force of the connection when the stopper is in the installed state.

According to a further aspect of the invention, in the sealing region, the stopper has a groove which runs along the periphery of the stopper and into which the sealing element is injection-molded at least in regions.

This advantageously achieves a secure connection between the stopper on one side and the sealing element on the other. In particular, the outermost surface of the stopper may be melted at least in regions by the injection-molding of the sealing element. This may create a substance-bonded connection between the stopper and the sealing element. In addition, it is easy to injection-mold the sealing element onto the stopper, for example using a (known) two-component injection-molding process. Because the groove predefines the shape of the sealing element at least in regions, or corresponds to this at least in regions, in addition advantageously costs can be saved so that the tool design may be less complex.

According to a further aspect of the invention, at least one region of the sealing element is formed at least partially, in particular completely, so as to be circumferential, in particular rotationally symmetrical. In this way, the sealing element may advantageously be produced easily. This may also reduce production costs.

According to a further aspect of the invention, the stopper is made, in particular injection-molded, from a first plastic material, in particular a thermoplastic material. The material and production costs of a stopper may thereby advantageously be kept low.

According to a further aspect of the invention, the sealing element is made from a second plastic material, in particular an elastomer, a thermoplastic elastomer, a silicon and/or a silicon-like substance.

Such a choice of material firstly allows the production and material costs to be kept low, and secondly allows good sealing properties to be achieved. In addition, a suitable choice of material for the sealing element advantageously allows the effect of the force coupling to be further increased. In particular, the sealing effect of the sealing element may thereby be guaranteed even under high thermal and/or mechanical (dynamic) influences. Also, the sealing effect may be maintained on occurrence of a "settling" movement, i.e. loss of preload force.

According to a further aspect of the invention, the stopper is or can be received completely by the opening of the housing of the energy storage system, such that the stopper terminates flush with the outside of the housing.

Advantageously, an unnecessary increase in housing dimensions may thereby be avoided. This may also increase the handling safety since risk of injury, which could for example be caused by any sharp edges if the stopper were to protrude, can be reduced.

According to a further aspect of the invention, the connecting region of the stopper has an external thread for connecting the stopper to the opening by form fit and force fit.

Advantageously, this allows a secure but releasable connection to be achieved between the housing and the stopper.

According to a further aspect of the invention, the connecting region is configured as a push-fit connection for connecting the stopper to the opening by form fit and force fit.

In comparison with a screw connection, a push-fit connection can be installed and removed more quickly and is also easier to produce. Furthermore, at least one locking lug may be formed on the push-fit connection in order to connect the stopper by form fit to a corresponding recess in the opening of the housing.

According to a further aspect of the invention, a circumferential protrusion is arranged in the sealing region between the sealing element and the connecting region, which protrusion spaces the sealing element from the connecting region, in particular from a top thread turn of the connecting region viewed in the axial direction of the stopper, by 2 mm to 6 mm, preferably by 3 mm to 5 mm.

Advantageously, the distance between the sealing element and the connecting region may thereby be reduced, whereby a force reduction from elongation of the stopper body, in particular the connecting region, may be avoided or reduced. Such a force reduction would however reduce the sealing effect of the sealing element.

According to a further aspect of the invention, the sealing element, in particular a first region of the sealing element, is at least substantially undeformed in the radial direction of the stopper, even in the fitted state of the stopper.

This gives the advantage that the material of the sealing element does not deteriorate even on repeated installation/removal, since no crush load or force is applied in the radial direction. Thus the sealing effect of the stopper may be guaranteed even after repeated installation/removal processes, for example on refill processes.

The object cited initially is also achieved according to claim 16 by an energy storage system for use in a vehicle, which comprises a multiplicity of energy storage cells and a housing which is configured to receive the multiplicity of energy storage cells, and which has at least one opening, in particular at least one filling opening for filling the housing with a liquid electrolyte. In each case, an opening is or can be closed by means of a stopper as described above which is assigned to the respective opening.

In this way, openings in the energy storage system can advantageously be closed easily and economically. In particular, the openings may be opened or closed repeatedly when for example water and/or a liquid electrolyte must be added, without reducing the sealing effect of the sealing element.

The invention is described in more detail below, including regarding further features and advantages, using the description of embodiments with reference to the accompanying drawings. In the figures.

The stopper according to the invention is described in greater detail below with reference to the depictions in FIGS. 1 to 5. Identical or equivalent elements and functions are provided with the same or similar reference signs.

Figure 1:
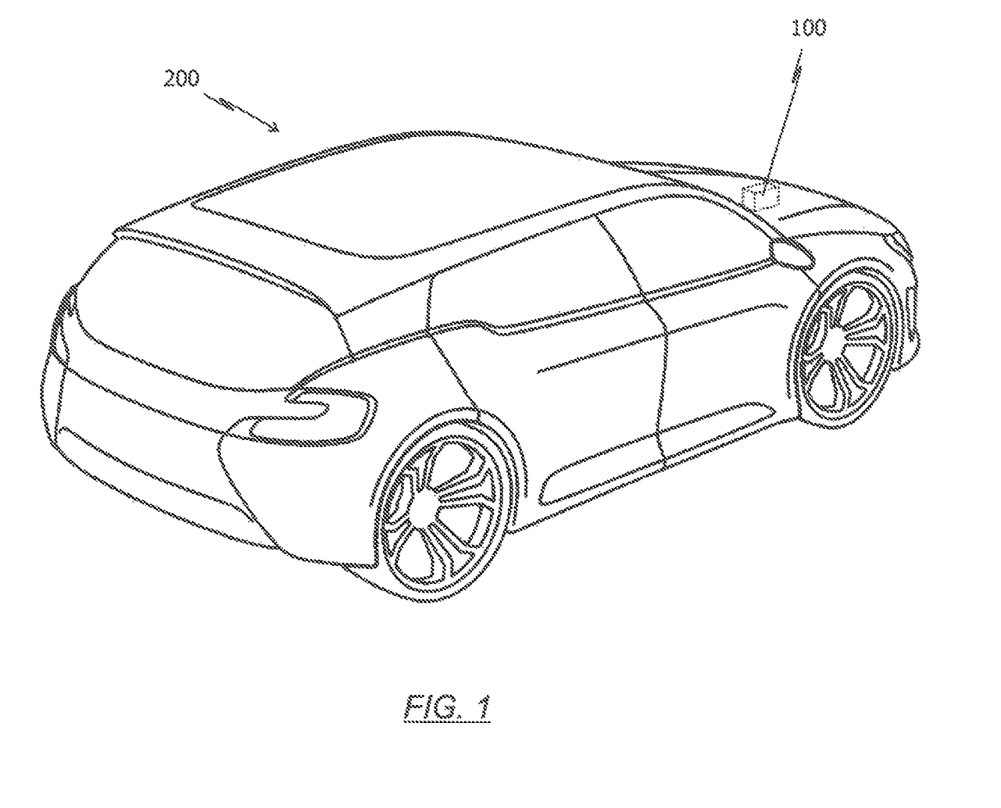
FIG. 1 shows a diagrammatic depiction of a vehicle.

FIG. 1 shows a schematic representation of a vehicle 200 which has at least one energy storage system 100. The energy storage system 100 furthermore comprises a multiplicity of energy storage cells, wherein several energy storage cells may also be combined into individual energy storage modules. In this case, the energy storage system 100 may be arranged in a region of the vehicle 200 which is at the front in the direction of travel, in a rear region of the vehicle 200 and/or in a region underneath the seats, in particular underneath the driver's seat.

The vehicle 200 may be an aircraft or a watercraft, a rail vehicle, an all-terrain vehicle, or preferably a road vehicle, wherein a road vehicle can mean a car, a truck, a bus, or a motor home. However, it is equally conceivable for the vehicle 200 also to be designed as any construction machine, electric scooter, electric bicycle, lawnmower, wheelchair or the like.

The vehicle 200 is driven by a drive unit. The drive unit may be an internal combustion engine, an electric motor or a combination thereof. A vehicle 200 which is driven exclusively by an electric motor is referred to as an electric vehicle. A vehicle 200 which has both an electric motor and an internal combustion engine is referred to as a hybrid vehicle. Hybrid vehicles can then be divided into micro hybrid, mild hybrid, full hybrid and plug-in hybrid vehicles.

In FIG. 1, the energy storage system 100 is shown in a front region viewed in the direction of travel of the vehicle 200.

The energy storage system 100 in general comprises a multiplicity of energy storage cells. Several such energy storage cells may also be combined in an energy storage module, wherein these energy storage cells are connected electrically in series and/or in parallel. The energy storage system 100 may then comprise a multiplicity of such energy storage modules which are connected together electrically in series and/or in parallel.

The energy storage system 100 may be based on a lead acid technology, a lithium ion technology, or a nickel-metal hydride technology, but is not restricted thereto.

Furthermore, an energy storage system 100 has a housing 110 which is configured to receive the multiplicity of energy storage cells or energy storage modules. The housing 110 may have a multiplicity of wall elements which delimit an interior of the housing 110 receiving the energy storage cells or energy storage modules. The wall element situated at the top viewed in the fitted state of the energy storage system 100 (and at least substantially horizontal) is usually formed as a housing cover which can be placed in position. The housing cover here comprises two connection poles which are or may be connected to the respective positive and negative terminals of the energy storage cells or energy storage modules.

The housing 110 of the energy storage system 100 may be made of a plastic. An acrylonitrile butadiene styrene, polycarbonate, polyamide, polyvinyl chloride, polyethylene terephthalate, polyoxymethylene, polyolefins such as polyethylene and/or polypropylene, or a copolymer thereof, may be chosen for example.

In addition, at least one opening 120 is arranged in the housing 110 of the energy storage system 100, in particular in the housing cover. For example, such an opening 120 may be a filling opening for filling the housing 110 with the liquid electrolyte. Equally, this opening 120 may however also be configured for at least temporary insertion of measurement elements, such as for example an acid indicator or similar. Such openings 120 are however closed again in operation, i.e. after completion of a filling process or measurement process. For this, each opening 120 is or can be closed using a respective stopper 1 according to the invention, which is assigned to the respective opening 120.

It is however equally conceivable that such openings 120 may also be present in a housing of an energy storage module or in a housing of an energy storage cell. Such openings may also be closed using the stopper 1 according to the invention.

Figure 2:
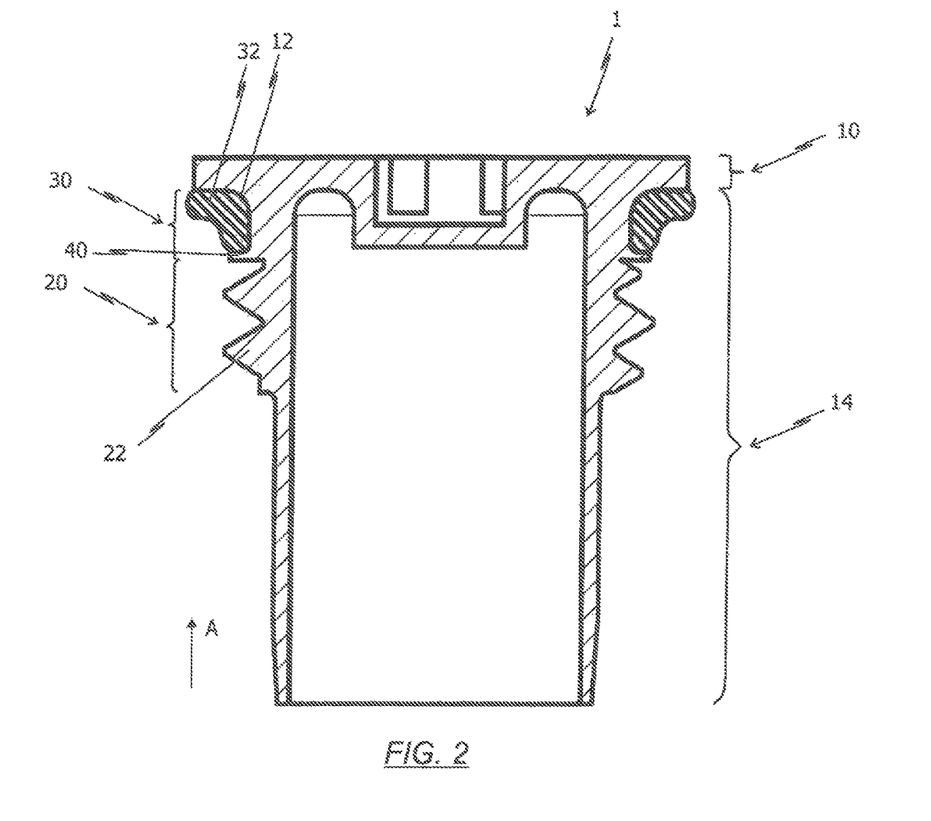
FIG. 2 shows a diagrammatic depiction of a stopper according to the present invention in the non-fitted state.

FIG. 2 shows the stopper 1 according to the invention in the non-fitted state. Such a stopper 1 may be used to close and seal an opening 120 of an energy storage system 100, an energy storage module and/or energy storage cell.

With reference to the stopper 1, the relative terms used in the present application should be interpreted as follows. The term "at the top or above viewed in the axial direction A of the stopper 1" means, in the fitted state of the stopper 1, viewed in the direction of an exterior of the housing 110, and "at the bottom viewed in the axial direction A of the stopper 1" means, in the fitted state of the stopper 1, viewed in the direction of the interior of the housing 110. In other words, the term "above" or "below" need not necessarily coincide with a position in the vertical direction. Rather, this means that, for example in a case in which the opening 120 is arranged in a (side) wall element of the housing 110, the term "above" means closer to the exterior of the housing 110, and the term "below" means closer to the interior of the housing 110.

As evident in FIG. 2, the stopper 1 according to the invention comprises a stopper head 10 and a stopper body 14 formed integrally with the stopper head 10.

A sealing region 30 lying directly below the stopper head 10, and a connecting region 20 lying directly below the sealing region 30, are arranged on the stopper body 14.

The stopper body 14 is formed at least substantially sleeve-like, i.e. the stopper body 14 at least in regions has an annular cross-section such that an outer diameter of the stopper head 10 is between 10% and 40%, preferably between 15% and 40%, particularly preferably between 20% and 30% larger than an outer diameter of the stopper body 14, in particular in a region below the connecting region 20.

In FIG. 2, it is furthermore evident that a lower region of the stopper body 14, viewed in the axial direction A of the stopper 1, may be chamfered. This facilitates both production and installation of the stopper 1, in particular insertion of the stopper 1 in the opening 120. Such a chamfer leads to easier removal from the mould during the production process. In this way, cost-intensive and complex ejector mechanisms may be avoided. Also, the stopper 1 may be precentered by the chamfer on installation.

The connecting region 20 serves to connect the stopper 1 according to the invention to an opening 120 in the housing 110, in particular in the housing cover, of the energy storage system 100. For this, the connecting region 20 may have an external thread 22 which comes into engagement with a corresponding internal thread of the opening 120.

However, it is equally conceivable that the connecting region 20 is configured as a push-fit connection. This advantageously facilitates installation of the stopper 1 according to the invention. For this, the connecting region 20 may comprise locking lugs for engagement in a correspondingly formed geometry in the opening 120, such that a form-fit and/or force-fit connection is created between the stopper 1 and the opening 120.

The sealing region 30 is configured to receive a sealing element 32.

The sealing element 32 may have a shape which differs at least substantially from a circular form, even in a non-fitted state of the stopper 1 which is accompanied by an undeformed state of the sealing element 32.

In particular, the cross-section of the sealing element 32 may be substantially L-shaped. In this context, "substantially L-shaped" means firstly that the cross-section of the sealing element 32 has two legs enclosing an angle which amounts to between 80° and 100°, preferably between 85° and 95°, particularly preferably 90°, and secondly that the edges and/or corners of the sealing element 32 may be formed rounded or curved.

The sealing element 32 may in particular have a first region formed in the direction of a side of the sealing element 32 facing the connecting region 20, and a second region on a side of the sealing element 32 facing away from the connecting region 20.

The sealing element 32 may be shaped, even in the non-fitted state of the stopper 1 or the undeformed state of the sealing element 32, such that the second region of the sealing element 32 has a larger outer diameter than the first region. More precisely, the first region of the sealing element 32 extends substantially in the axial direction A of the stopper 1, whereas the second region of the sealing element 32 extends outward substantially in a radial direction of the stopper 1 lying perpendicularly to the axial direction A of the stopper 1.

In this context, "substantially in the axial direction A of the stopper 1" means that the extension direction differs from the axial direction A of the stopper 1 by less than 10°, preferably less than 5°, particularly preferably less than 3°.

It is conceivable that the first region and the second region do not transform directly into each other, but rather are connected together via a transitional region. This transitional region may for example be an additional region which extends in a direction opposite the first region, such that the sealing element 32 for example has a substantially T-shaped cross-section.

The stopper 1 may furthermore have a groove 12 which runs along a periphery of the stopper 1 in the sealing region 30 and is configured to receive the sealing element 32. In particular, the sealing element 32 may be injection-molded directly into the groove 12. This advantageously gives a secure, in particular substance-bonded connection.

Viewed in the axial direction a of the stopper 1, the sealing element is delimited at the top by the stopper head 12 and at the bottom by a circumferential protrusion 40. The circumferential protrusion 40 is arranged between the sealing element 32 and the connecting region 20 and is configured to space the sealing element 32 from the connecting region 20, in particular from a top thread turn of the connecting region 20 viewed in the axial direction A of the stopper 1, by 2 mm to 6 mm, preferably by 3 mm to 5 mm.

The stopper may be made of a first plastic material. In particular, the first plastic material is a thermoplastic material such as for example polyethylene, polypropylene, polyamide, acrylonitrile butadiene styrene, polybutylene terephthalate, polyetherimide, polyimide, polytetrafluoroethylene and/or polyoxymethylene.

The sealing element 32 may be made from a second plastic material which is different from the first plastic material. In particular, the second plastic material is an elastic material such as for example an elastomer, thermoplastic elastomer, silicon and/or a silicon-like substance.

The stopper according to the invention can thus be produced easily and economically via a two-component injection-molding process. This furthermore guarantees a good connection between the stopper 1 and the sealing element 32. In particular, when the sealing element 32 is injection-molded onto the stopper 1, in particular into the groove 12 of the stopper 1, the outermost surface of the stopper 1 or groove 12 may melt so as to create a substance-bonded connection between the sealing element 32 and the stopper 1.

The sealing element 32 may furthermore be configured such that at least one region of the sealing element 32 is formed running at least partially, in particular completely around the stopper 1. Thus for example the second region of the sealing element 32 may be formed completely circumferentially, while the first region runs around the stopper 1 only in regions, in particular at two opposing sides of the stopper 1, preferably at three sides evenly distributed around the periphery of the stopper 1, particularly preferably at four sides evenly distributed around the periphery of the stopper 1. This may save material and hence costs.

Alternatively, the sealing element 32 may equally well be configured so as to be rotationally symmetrical, which also reduces costs since the tool for a symmetrical sealing element 32 has a less complex design.

The stopper 1 according to the invention is based on the knowledge that it is advantageous for the sealing element 32, in the fitted state of the stopper 1, to be deformed by a force acting at least partially, in particular completely in the axial direction A of the stopper 1. This counters in particular a reduction in the sealing effect from "settling" of the elements of the stopper 1 to be connected, since in the fitted state of the stopper 1, a force coupling occurs between the force acting at least partially, in particular completely in the axial direction A of the stopper 1, and a reset force caused by the material of the sealing element 32 because of the force acting at least partially, in particular completely in the axial direction A of the stopper 1.

In particular, a sealing effect of the sealing element 32 can be produced by the force acting at least partially, in particular completely in the axial direction A of the stopper 1.

The sealing element 32 is here advantageously spaced from the connecting region 20 only by the circumferential protrusion 40. In this way, a force-reducing elongation of the stopper body 14 may be suppressed.

Figure 3:
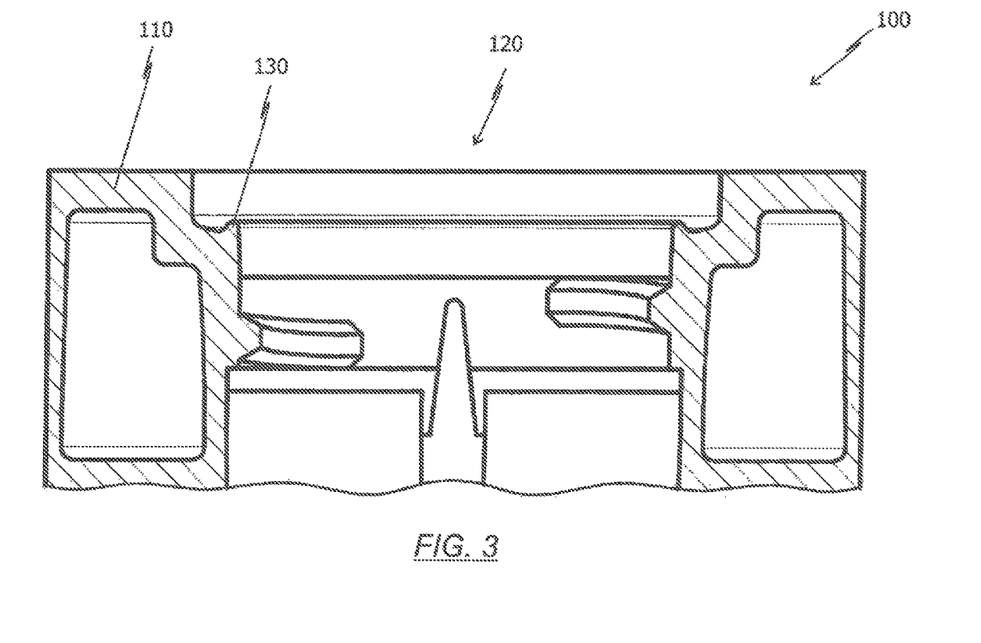
FIG. 3 shows a diagrammatic depiction of an opening in a housing for receiving a stopper according to the invention.

FIG. 3 shows the opening 120 receiving the stopper 1 according to the invention, in a housing 110 of an energy storage system 100. In particular, FIG. 3 shows a sealing rib 130 which extends along an inner periphery of the opening 120 receiving the stopper 1, in the direction of an exterior of the energy storage system 100. This sealing rib 130 is configured to come into engagement with the sealing element 32 of the stopper 1 in the fitted state of the stopper 1.

The term "inner periphery of the opening 120 receiving the stopper 1" means the periphery of a region of the opening 120 receiving the stopper body 14. More precisely, the opening 120 has at least two different regions with different diameters. The first region corresponds to a depression and is designed to receive the stopper head 10. The second region has a diameter which is smaller than the diameter of the first region and is configured to receive the stopper body 14, in particular the connecting region 20.

Figure 4:
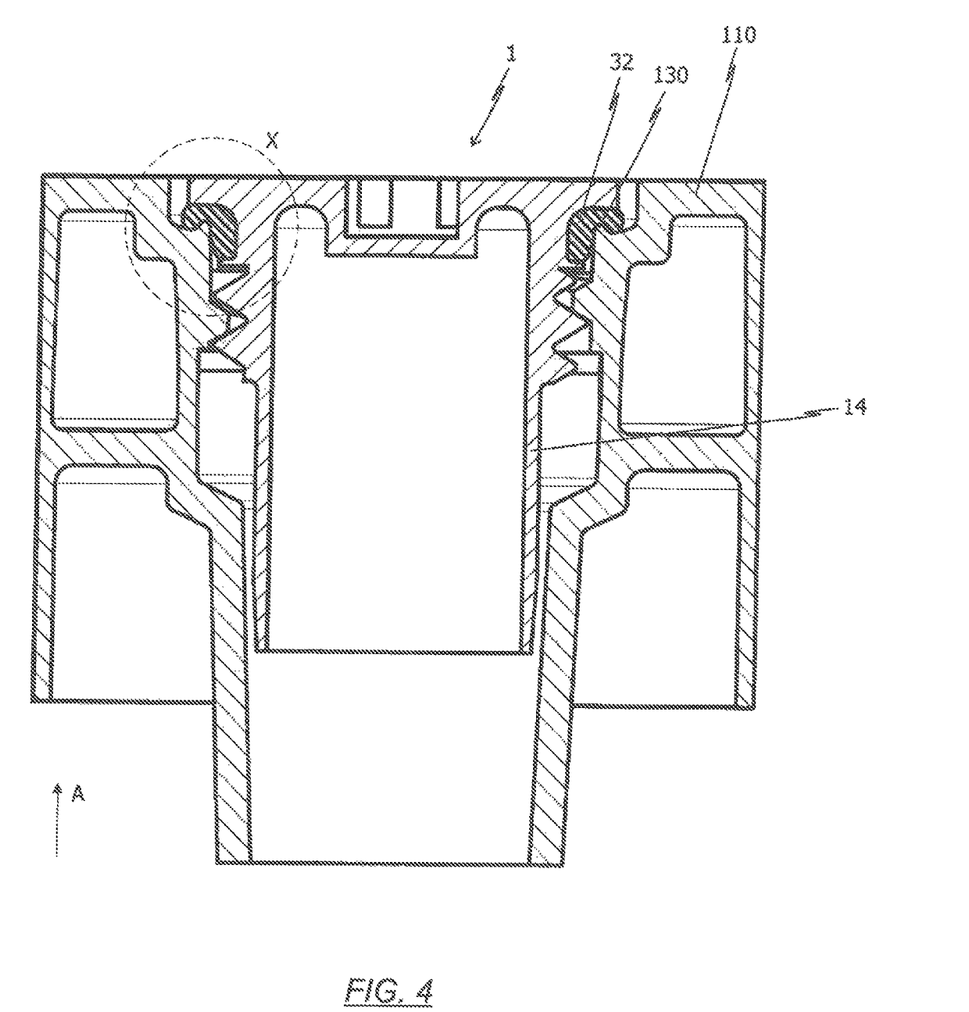
FIG. 4 shows a diagrammatic depiction of the stopper and the opening with the stopper in the fitted state.

FIG. 4 shows the stopper 1 according to the invention in fitted state in which the stopper 1 is connected to the opening 120, in this case for example via a screw connection. It is evident that the sealing ring 130 deforms the sealing element 32, in particular the second region of the sealing element 32, by a force acting at least substantially in the axial direction A of the stopper 1.

By suitable choice of material of the sealing element 32, in particular because the sealing element 32 is made from an elastic material, an advantageous force coupling exists in the fitted state of the stopper 1, i.e. In the deformed state of the sealing element 32. Because the sealing rib 130 produces a force acting on the sealing element 32 in the axial direction A of the stopper 1, and the sealing element 32 creates a reset force which acts in the opposite direction to the axial force created by the sealing rib 130, the sealing effect of the sealing element 32 may be maintained even under high thermal and/or mechanical (dynamic) influences which could otherwise cause a reduction in both forces, for example because of a change in material properties or by producing "settling" movements. The term "settling" or "settling movements" means a loss of the preload force of the connection.

Figure 5:
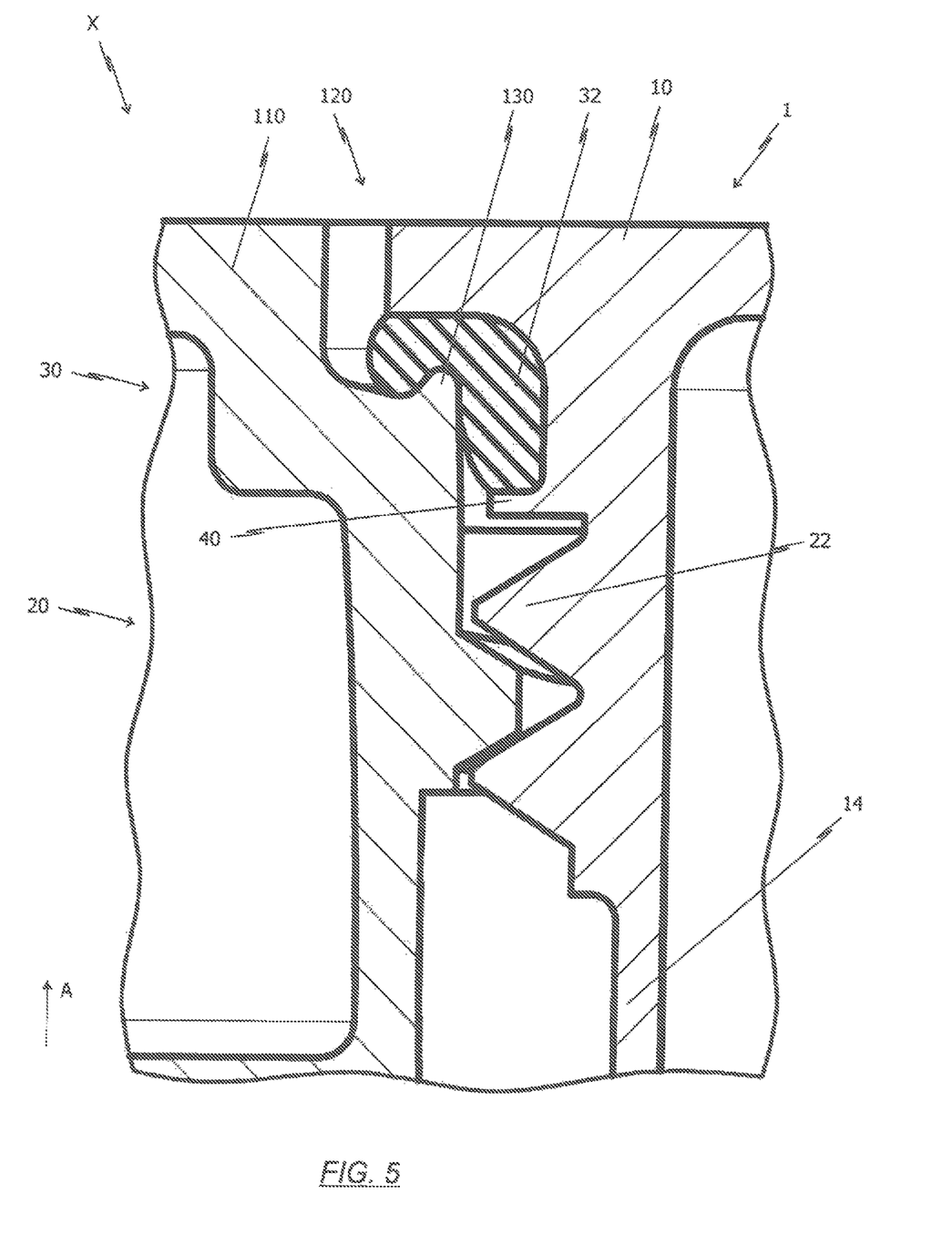
FIG. 5 shows a diagrammatic detail depiction of the region marked X in FIG. 4.

FIG. 5 shows in a detail view the region X marked with a dotted circle in FIG. 4. It is clearly evident that the sealing element 32 is deformed exclusively in the axial direction A of the stopper 1 and in particular not in a radial direction. This advantageously leads to simple installation of the stopper 1 in the housing.

It is also evident that the stopper head 10 terminates flush with an outside of the housing 110. Thus for example risk of injury from any sharp edges can be avoided, which improves the handling safety.

Even if not explicitly shown in the figures, the stopper 1 may also be used in a housing 110 of an energy storage module or energy storage cell.

Also, the connecting region 20 of the stopper 1 may be configured as a push-fit connection instead of the external thread 22. This further simplifies installation of the stopper 1 in the opening 120. Furthermore, locking lugs arranged on the stopper body 14 and designed to cooperate with corresponding recesses in the opening 120, may create a form-fit connection.

At this point it should be noted that all the parts described above, viewed alone or in any combination, in particular the details shown in the drawings, are claimed as essential to the invention. Amendments thereof are familiar to the person skilled in the art.

REFERENCE CHARACTER LIST

1 Stopper
10 Stopper head
12 Groove
14 Stopper body
20 Connecting region
22 (External) thread
32 Sealing region
32 Sealing element
40 Circumferential protrusion
100 Energy storage system
110 Housing
120 Opening
130 Sealing rib
200 Vehicle
A Axial direction of stopper
X Detail view

The invention claimed is:

1. A stopper for closing and sealing an opening in a housing of an energy storage system, wherein the stopper comprises the following:
 a connecting region which is configured to come into engagement with the opening of the energy storage system; and
 a sealing region which is arranged above the connecting region in an axial direction of the stopper,
wherein the sealing region is configured to receive a sealing element which is designed to be deformed by a force completely acting in the axial direction of the stopper when the stopper is in an installed state, such that a sealing effect of the sealing element is created by the force completely acting in the axial direction of the stopper, wherein a cross-section of the sealing element has an L shape both when the stopper is in the installed and when the stopper is in an uninstalled state, wherein the sealing element comprises a first portion on a side of the sealing element facing the connecting region and a second portion on a side of the sealing element facing away from the connecting region, wherein the second portion of the sealing element comprises an outer diameter in a radial direction of the stopper that is, both in the installed and the uninstalled state of the stopper, greater than the outer diameter in the radial direction of the stopper of the first portion, and wherein the sealing element is formed so as to be completely circumferential and rotationally symmetrical.

2. The stopper as claimed in claim 1, wherein the sealing element has a first region on a side of the sealing element facing the connecting region, and a second region on a side of the sealing element facing away from the connecting region.

3. The stopper as claimed in claim 2, wherein the second region of the sealing element in an uninstalled state of the stopper has a larger outer diameter than the first region.

4. The stopper as claimed in claim 2, wherein in an installed state of the stopper, the second region of the sealing element is in engagement with a sealing rib which extends upward in the direction of the sealing region of the stopper, viewed in the axial direction of the stopper, along an inner periphery of the opening receiving the stopper, and which is configured to exert the force acting completely in the axial direction of the stopper on the second region of the sealing element.

5. The stopper as claimed in claim 1, wherein in the sealing region, the stopper has a groove which runs along a periphery of the stopper and into which the sealing element is injection-molded at least in regions.

6. The stopper as claimed in claim 1, wherein the stopper is made from a thermoplastic material.

7. The stopper as claimed in claim 1, wherein the sealing element is made from at least one of an elastomer, a thermoplastic elastomer, silicon and a silicon-like substance.

8. The stopper as claimed in claim 1, wherein, in the installed state of the stopper, the stopper is received completely by the opening of the housing of the energy storage system, such that the stopper terminates flush with an outside of the housing.

9. The stopper as claimed in claim 1, wherein the connecting region of the stopper has an external thread for connecting the stopper to the opening by form fit and force fit.

10. The stopper as claimed in claim 1, wherein the connecting region is configured as a push-fit connection for connecting the stopper to the opening by form fit and force fit.

11. The stopper as claimed in claim 1, wherein a circumferential protrusion is arranged in the sealing region between the sealing element and the connecting region, which the circumferential protrusion spaces the sealing element from the connecting region from a top thread turn of the connecting region viewed in the axial direction of the stopper, by 2 mm to 6 mm.

12. The stopper as claimed in claim 4, wherein the sealing element—is at least substantially undeformed in a radial direction of the stopper in the installed state of the stopper.

13. An energy storage system for use in a vehicle, comprising the following:
   a multiplicity of energy storage cells; and
   a housing which is configured to receive the multiplicity of energy storage cells, and
   which has at least one opening for filling the housing with a liquid electrolyte,
wherein each opening is or can be closed by means of a respective stopper as claimed in claim 6 which is assigned to the respective opening, wherein in the installed state of the stopper, the sealing element is in engagement with the sealing rib which extends upward in the direction of the sealing region of the stopper, viewed in the axial direction of the stopper, along the inner periphery of the opening receiving the stopper, and which is configured to exert the force acting in the axial direction of the stopper on the sealing element.

* * * * *